United States Patent
Karasawa

(10) Patent No.: US 6,665,315 B1
(45) Date of Patent: Dec. 16, 2003

(54) TRANSMISSION APPARATUS AUTOMATICALLY ACQUIRING IDENTIFYING INFORMATION AND INDEPENDENTLY MEASURING PROPAGATION DELAY

(75) Inventor: Satoru Karasawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/450,274

(22) Filed: Nov. 26, 1999

(30) Foreign Application Priority Data

Nov. 27, 1998 (JP) .......................................... 10-337009

(51) Int. Cl.$^7$ ................................................. H04J 3/06
(52) U.S. Cl. ...................... 370/508; 370/519; 709/208
(58) Field of Search .................. 370/508, 509, 370/510, 512, 513, 516, 517, 518, 519, 520, 229, 235, 236.2, 239, 240, 256, 395.1, 407, 408, 425, 446, 449, 457, 458; 709/203, 208, 209, 220, 223

(56) References Cited

U.S. PATENT DOCUMENTS

| | | | | |
|---|---|---|---|---|
| 5,212,534 A | * | 5/1993 | Bianchi et al. ............. | 429/160 |
| 5,327,277 A | * | 7/1994 | Van Der Plas et al. ..... | 359/140 |
| 5,793,772 A | * | 8/1998 | Burke et al. ................ | 370/508 |
| 6,237,026 B1 | * | 5/2001 | Prasad et al. ............... | 709/204 |
| 6,249,814 B1 | * | 6/2001 | Shaffer et al. .............. | 709/223 |
| 6,400,688 B1 | * | 6/2002 | Lau et al. ................. | 370/236.1 |
| 6,477,154 B1 | * | 11/2002 | Cheong et al. ............. | 370/328 |

FOREIGN PATENT DOCUMENTS

| | | |
|---|---|---|
| JP | 5-336143 | 12/1993 |
| JP | 04-301911 | 5/1994 |
| JP | 6-326723 | 11/1994 |
| JP | 08-245545 | 3/1998 |
| JP | 10-256993 | 9/1998 |
| JP | 2000-013426 | 1/2000 |

OTHER PUBLICATIONS

Suzuki et al., "PDS Optical Subscriber System," NEC Gihou, 1993, pp. 58–64, vol. 46, No. 3.

* cited by examiner

Primary Examiner—Douglas Olms
Assistant Examiner—Brian Nguyen
(74) Attorney, Agent, or Firm—Venable LLP; Michael A. Sartori

(57) ABSTRACT

A transmission apparatus for use in a master station in a passive double-star communication network has a management unit and a measurement unit. The management unit automatically acquires information identifying slave stations in the network. The measurement unit measures the propagation delays of the slave stations after their identifying information has been acquired. The management unit manages control states related to delay control in the transmission apparatus as a whole, and issues commands to the measurement unit. The measurement unit manages the state of the delay-measurement operation for each slave station individually.

5 Claims, 5 Drawing Sheets

FIG. 4

| EVENT \ STATE | R1 | R2 | R3 | R4 |
|---|---|---|---|---|
| POWER-ON RESET | → R1 | — | — | — |
| START OF ACQUISITION | 1ST COMMAND → R2 | ALGORITHM (BINARY TREE) | — | 1ST COMMAND → R2 |
| ACQUISITION COMPLETION | — | STORE SLAVE-STATION ID CODE | — | — |
| SETTING COMPLETION | 1ST COMMAND 2ND COMMAND → R3 | 2ND COMMAND → R3 | 2ND COMMAND | 1ST COMMAND 2ND COMMAND → R3 |
| END OF DELAY CONTROL | — | — | → R4 | — |
| ALARM | REPEAT DELAY CONTROL → R3 | | | |

FIG. 5

| EVENT \ STATE | S0 | S1 | S2 | S3 |
|---|---|---|---|---|
| 1ST COMMAND RECEIVED | UPSTREAM OH MESSAGE → S2 | — | — | — |
| 2ND COMMAND RECEIVED | — | UPSTREAM OH MESSAGE → S2 | — | — |
| 1ST COMMAND CANCELED | — | → S0 | → S0 | — |
| 2ND COMMAND CANCELED | — | — | → S0 | → S0 |
| MEASUREMENT SUCCEEDS | — | — | END OF DELAY CONTROL → S3 | — |
| MEASUREMENT FAILS | — | — | ALARM → S0 | — |
| ALARM | — | — | — | → S0 TO REPEAT DELAY CONTROL |
| OPERATION | | UNASSIGND GRANTS AND RANGING GRANT | UNASSIGNED GRANTS AND PLOAM GRANT. SET EXPECTED TIME AND MEASURE DELAY | SUPERVISE ARRIVAL PHASE OF RECEIVED CELLS |

TRANSMISSION APPARATUS AUTOMATICALLY ACQUIRING IDENTIFYING INFORMATION AND INDEPENDENTLY MEASURING PROPAGATION DELAY

BACKGROUND OF THE INVENTION

The present invention relates to a transmission apparatus for use in a master station in a passive double-star communication network such as a passive optical network (PON) employing the asynchronous transfer mode (ATM).

ATM-PON technology has been undergoing recent research and development as a way to introduce optical fibers into subscriber lines in telecommunication networks.

FIG. 1 is a block diagram illustrating the basic ATM-PON connection topology. A plurality of slave stations 1-1 to 1-N, each having subscriber terminal equipment, are coupled to a master station 2 through a star coupler 3. The star coupler 3 is coupled to the master station 2 by an optical fiber 4, and to the slave stations 1-1 to 1-N by further optical fibers 5-1 to 5-N. ATM cells are transferred at arbitrary timings in the downstream direction, from the master station 2 to a slave station 1-n (where n is a number from 1 to N), and at timings specified by the master station 2 in the upstream direction, from slave station 1-n to master station 2. The upstream transmission timings specified by the master station 2 are spaced at intervals enabling the ATM cells from the slave stations to arrive at the master station 2 one after another, without mutual interference or collision.

The slave stations 1-1 to 1-N are located at different distances from the master station 2, however. If each slave station transmits cells at the specified timings, without further adjustment, ATM cells arriving at the master station 2 from different slave stations may partially overlap, because of different propagation delays.

The master station 2 accordingly measures the propagation delay of each slave station 1-n and reports the result of the measurement to slave station 1-n, which adjusts its ATM cell transmission timing accordingly. This adjustment is also referred to as a phase adjustment, because it causes the ATM cells from slave stations 1-1 to 1-N to arrive at the master station 2 in phase with one another on the same time axis. The entire process of measuring delays and adjusting upstream transmission timings is referred to as delay control.

A conventional delay control method was disclosed in 1993 in Japanese Unexamined Patent Application No. 5-336143.

In this method, the master station 2 sends a first phase correction time, a slave-station identification code, and a request signal requesting the transmission of a phase adjustment signal by the slave station in an idle time slot in the downstream direction. A time slot normally includes both ATM cells and physical layer operations, administration, and maintenance cells or PLOAM cells. An idle time slot, which is not used for communication, includes a PLOAM cell and a plurality of idle cells. If the received slave-station identification code matches the identification code of slave station 1-n, slave station 1-n sends a PLOAM cell in the upstream direction, delaying the upstream transmission timing by the first phase correction time. From the time of arrival of the received PLOAM cell and the first phase correction time, the master station 2 calculates the round-trip delay time of slave-station 1-n, calculates a second phase correction time that makes the round-trip delay equal to the round-trip delay of the most distant slave station, and sends the second phase correction time to slave station 1-n, again using an idle time slot. Thereafter, in sending ATM cells and other cells to the master station 2, slave station 1-n adjusts the transmission timing by the second phase correction time.

A problem in this conventional delay control method is that the master station 2 must already know the slave-station identification codes assigned to the slave stations 1-1 to 1-N. This places a major burden on network maintenance personnel. When a new slave station is added, for example, network maintenance personnel must speedily enter its slave-station identification code at the main station. It is also necessary for subscribers to report the slave-station identification code to network maintenance personnel each time a slave station is installed.

Another problem is the extensive use of idle time slots. When the round-trip delay time of slave station 1-n is being measured, an idle time slot is required in the upstream direction, so that the PLOAM cell sent by slave station 1-n does not collide with an ATM cell sent by another slave station. In the conventional method described above, to obtain this idle time slot in the upstream direction, the corresponding time slot in the downstream direction must also be left idle.

In data communication, bandwidth usage in the upstream and downstream directions is often asymmetrical. The network could be managed more efficiently if it were possible to send ATM cells with user data in the downstream direction even during an idle time slot in the upstream direction.

SUMMARY OF THE INVENTION

It is accordingly an object of the present invention to provide a master-station communication apparatus that can measure delay times without the need to acquire slave-station identification codes in advance, and can guarantee efficient network operation.

According to a first aspect of the invention, a transmission apparatus for use in a master station in a passive double-star communication network comprises a management unit and a measurement unit. The management unit automatically acquires information identifying slave stations, by having the slave stations transmit cells to the master station. The measurement unit measures the propagation delays of the slave stations after their identifying information has been acquired.

According to a second aspect of the invention, the management unit manages control states related to delay control in the transmission apparatus as a whole, while the measurement unit manages the state of the delay-measurement operation for each slave station individually. The control states managed by the management unit include a delay-measurement control state. In response to certain events, the management unit sends a command specifying one of the slave stations to the measurement unit, then enters the delay-measurement control state.

BRIEF DESCRIPTION OF THE DRAWINGS

In the attached drawings:

FIG. 4 is a state table describing the operation of the delay-control-state management unit 14 in FIG. 2; and FIG. 5 is a state table describing the operation of the delay measurement unit 13 in FIG. 2.

DETAILED DESCRIPTION OF THE INVENTION

Figure 1:
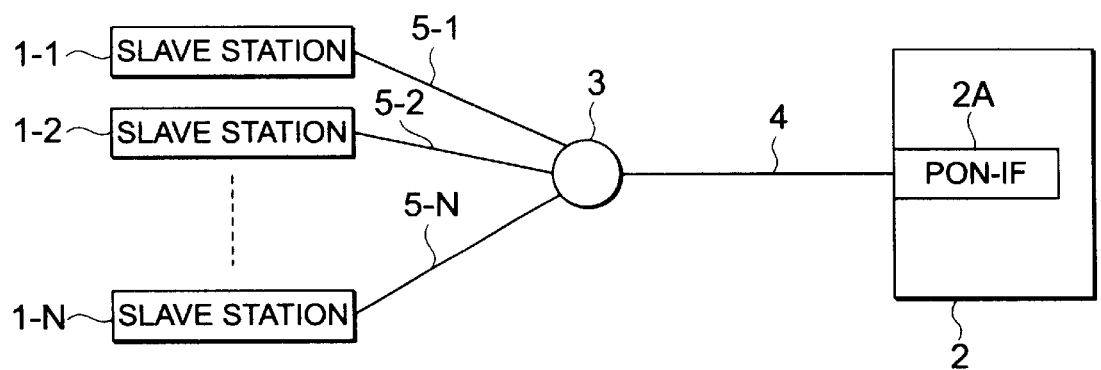
FIG. 1 illustrates the passive double-star network topology.

A transmission apparatus embodying the present invention will be described with reference to the attached drawings. The transmission apparatus is employed in a master station in an ATM-PON communication system. The master station 2 is coupled to a plurality of slave stations 1-1 to 1-N as illustrated in FIG. 1.

The master station has an ATM-PON interface circuit (PON-IF) 2A that terminates the optical fiber 4 and interfaces the master station 2 to the slave stations. Although FIG. 1 showed only a single ATM-PON interface circuit 2A, a plurality of ATM-PON interface circuits may be installed in the master station 2.

Figure 2:
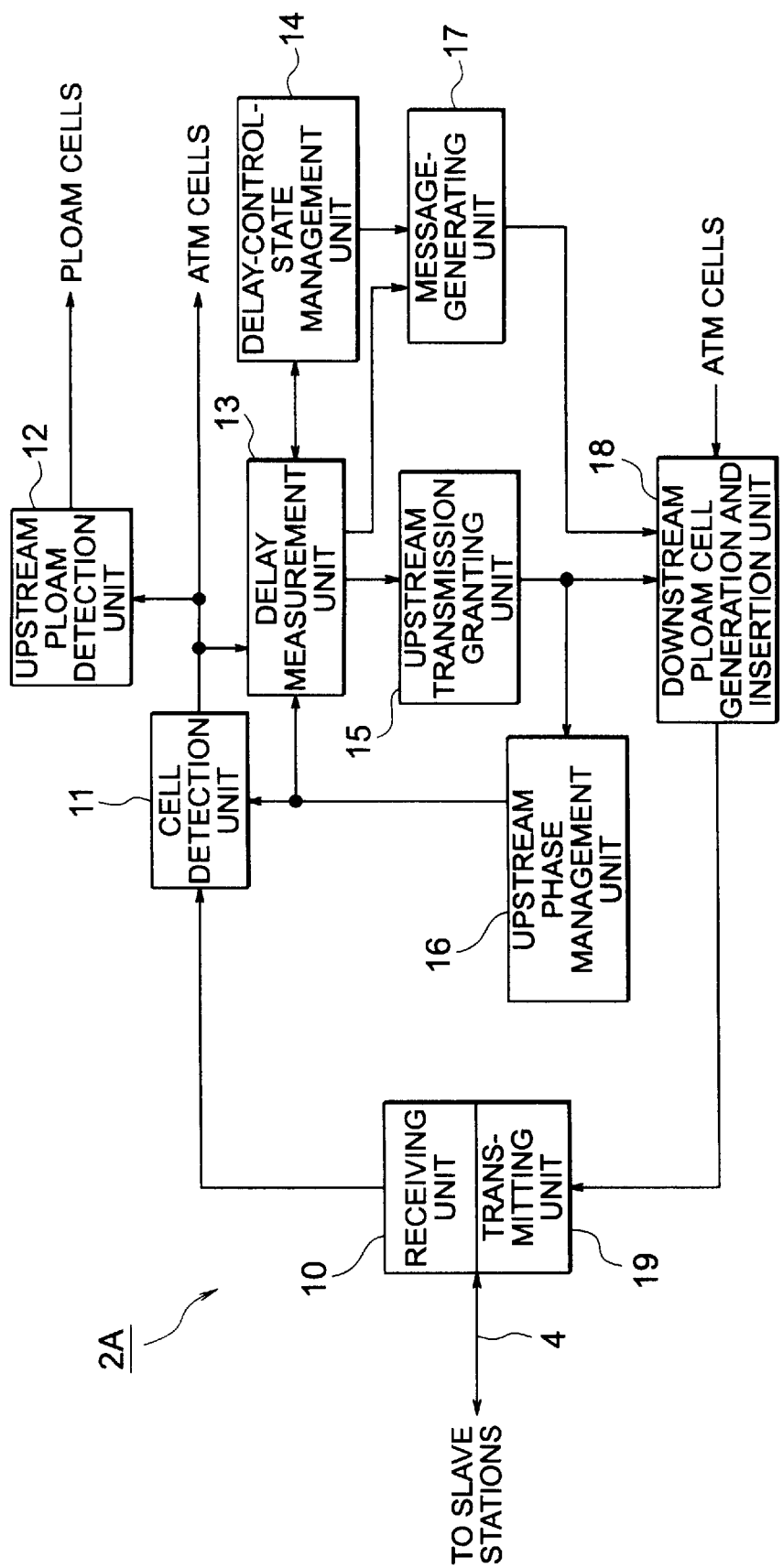
FIG. 2 is a block diagram of transmission apparatus employed in the master station in FIG. 1.

As shown in FIG. 2, the ATM-PON interface circuit 2A comprises a receiving unit 10, a cell detection unit 11, an upstream PLOAM detection unit 12, a delay measurement unit 13, a delay-control-state management unit 14, an upstream transmission granting unit 15, an upstream phase management unit 16, a message-generating unit 17, a downstream PLOAM cell generation and insertion unit 18, and a transmitting unit 19.

The receiving unit 10 receives the upstream optical signal from the optical fiber 4 and converts it to an electrical signal.

The cell detection unit 11 detects valid cells, including ATM cells and PLOAM cells, in the output of the receiving unit 10, and outputs the detected valid cells.

The upstream PLOAM detection unit 12 extracts upstream PLOAM cells in the output of the cell detection unit 11, and sends their included messages, which relate to operations, administration, and maintenance, to be analyzed in a message analysis unit (not visible). In the ATM-PON frame structure designated by the Telecommunication Standardization Sector of the International Telecommunication Union (ITU-T), upstream frames are transmitted consecutively, and contain both ATM cells and PLOAM cells. The ATM cells, which are not extracted by the upstream PLOAM detection unit 12 and remain in the cellstream output from the cell detection unit 11, are supplied to an ATM cell processing circuit (not visible), where appropriate processing, such as header conversion, is carried out.

The delay measurement unit 13 measures the delay time of a slave station 1-n by a method that will be described later, based on certain cells output from the cell detection unit 11, and manages states related to delay control of the slave stations 1-1 to 1-N individually. The states managed by the delay measurement unit 13 include an initial state, a measurement preparation state or preparatory state, a measurement state, and an operational state. These states will be described later.

The delay-control-state management unit 14 manages the state of the overall delay control process in the ATM-PON interface circuit 2A, without managing the states of individual slave stations. The states managed by the delay-control-state management unit 14 include an initial state, an automatic identification-code acquisition state, a delay control state, and an operational state. These states will be described later. The delay-control-state management unit 14 directly controls the operation of the delay measurement unit 13 and other functional blocks.

The upstream transmission-granting unit 15 generates signals that give the slave stations permission to transmit ATM cells and PLOAM cells in the upstream direction. The signals generated by the upstream transmission granting unit 15 are referred to as grants. Besides ATM grants and PLOAM grants, which give a particular slave station permission to transmit an ATM cell or PLOAM cell, there are unassigned grants, which forbid all of the slave stations 1-1 to 1-N to transmit signals in the upstream direction, and ranging grants, which give permission to transmit cells for the purpose of delay measurement, or to transmit light for test purposes before a delay measurement. Some of these grants are issued in response to instructions from the delay measurement unit 13, for the purpose of delay control.

The upstream phase management unit 16 stores the grants generated by the upstream transmission granting unit 15, including the grants related to delay control, thereby enabling the delay measurement unit 13 to compare the granted timings with the actual arrival times of cells at the ATM-PON interface circuit 2A.

The message-generating unit 17 generates messages to be inserted into downstream PLOAM cells. In the ATM-PON frame structure designated by the ITU-T, PLOAM cells are inserted in the downstream frames at regular intervals, separated by twenty-seven intervening cells. A downstream PLOAM cell has grant fields for specifying grants for twenty-seven upstream ATM cells or PLOAM cells, and a message field for sending information related to delay control, alarms related to the ATM-PON system, and other messages.

The downstream PLOAM cell generation and insertion unit 18 generates PLOAM cells from the grant signals supplied by the upstream transmission granting unit 15 and the messages supplied by the message-generating unit 17, and inserts these PLOAM cells into a cellstream received from an ATM cell processing circuit (not visible), inserting one PLOAM cell for every twenty-seven ATM cells (including idle cells). The resulting downstream channel signal, including ATM cells and PLOAM cells, is supplied to the transmitting unit 19.

The transmitting unit 19 converts the downstream channel signal from electrical to optical form, and transmits the optical signal on the optical fiber 4.

Figure 3:
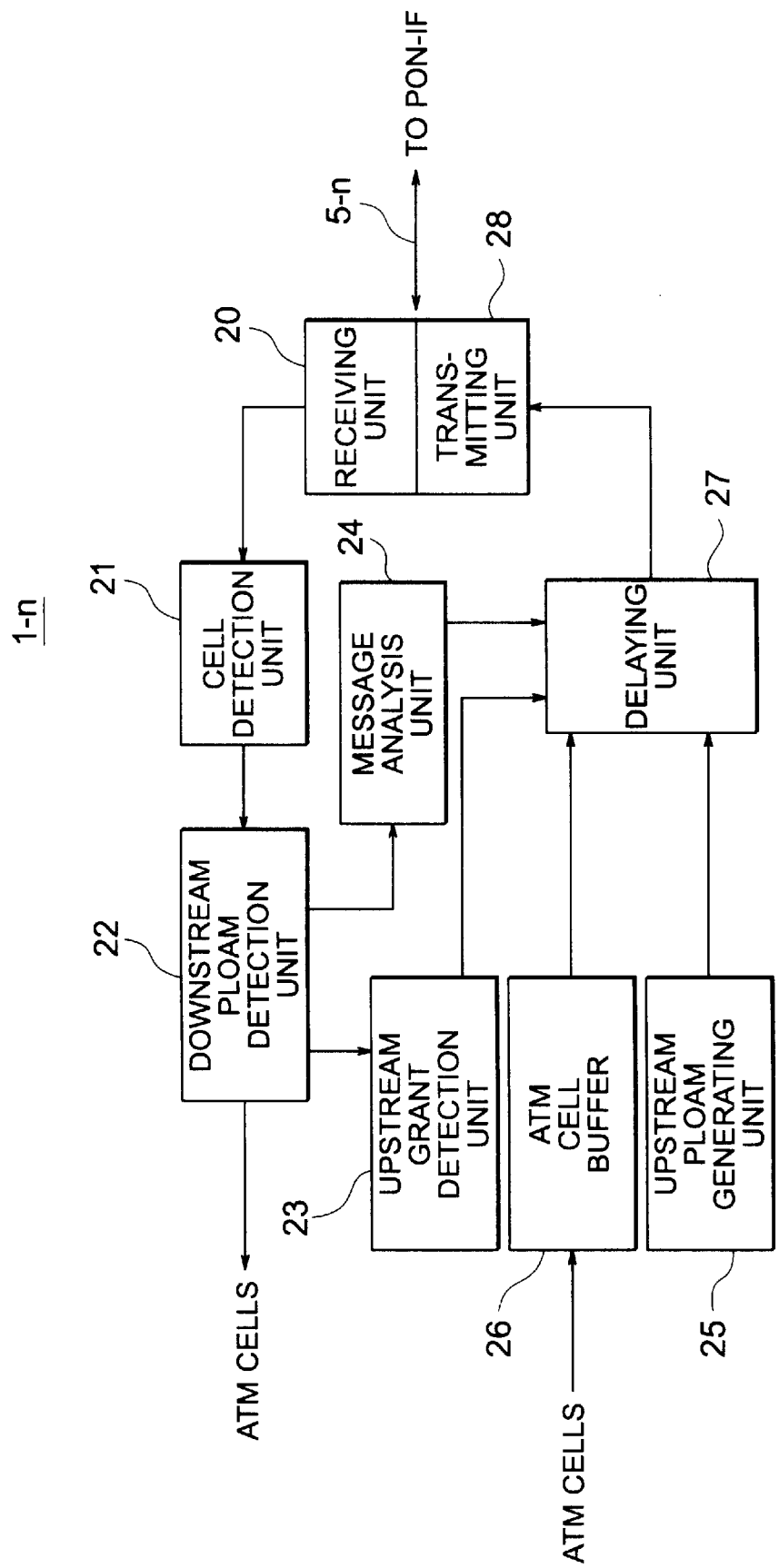
FIG. 3 is a block diagram of apparatus employed in the slave stations in FIG. 1.

Referring to FIG. 3, each slave station 1-n comprises a receiving unit 20, a cell detection unit 21, a downstream PLOAM detection unit 22, an upstream grant detection unit 23, a message analysis unit 24, an upstream PLOAM generating unit 25, an ATM cell buffer 26, a delaying unit 27, and a transmitting unit 28.

The receiving unit 20 receives the downstream optical signal from the optical fiber 5-n and converts it to an electrical signal.

The cell detection unit 21 detects valid cells, including downstream ATM cells and PLOAM cells, in the electrical signal output by the receiving unit 20.

The downstream PLOAM detection unit 22 extracts downstream PLOAM cells from the cellstream output from the cell detection unit 21, and provides the downstream PLOAM cells to the upstream grant detection unit 23 and message analysis unit 24. ATM cells, which are not extracted by the downstream PLOAM detection unit 22 and remain in the cellstream output from the cell detection unit 21, are provided to an ATM cell processing circuit (not visible) for appropriate processing, such as header conversion.

The upstream grant detection unit 23 detects upstream grant signals in the downstream PLOAM cells, determines whether or not slave station 1-n has been granted permission to transmit, and if permission is granted, determines whether the grant is for an upstream ATM cell or an upstream PLOAM cell. The upstream grant detection unit 23 also recognizes the cell position in the upstream frame into which the transmitted cell should be inserted.

The message analysis unit 24 reads and analyzes the messages in downstream PLOAM cells. When a message specifies a delay value for phase adjustment, the message analysis unit 24 sets the delay value in the delaying unit 27.

The upstream PLOAM generating unit 25 generates upstream PLOAM cells to be transmitted to the master station 2. The upstream PLOAM generating unit 25 generates upstream PLOAM cells both autonomously, and in response to the results of message analysis by the message analysis unit 24.

The ATM cell buffer 26 stores ATM cells received from the ATM cell processing circuit (not visible). When permission is granted to transmit an ATM cell, the ATM cell buffer 26 supplies the oldest of the stored ATM cells.

When notified by the upstream grant detection unit 23 that permission has been granted to transmit an ATM cell or PLOAM cell, at the proper timing, the delaying unit 27 takes the cell to be transmitted from the upstream PLOAM generating unit 25 or ATM cell buffer 26, adds the delay value set by the message analysis unit 24 to the transmit timing, and generates an upstream channel signal.

The transmitting unit 28 converts the upstream channel signal from electrical to optical form and transmits the optical signal on the optical fiber 5-n.

Next, the operation of this ATM-PON system, in particular operations related to delay control, will be described with reference to the state tables in FIGS. 4 and 5.

Referring to FIG. 4, the states managed by the delay-control-state management unit 14 are designated by the symbols R1 for the initial state, R2 for the automatic identification-code acquisition state, R3 for the delay control state, and R4 for the operational state. As noted above, these states concern delay control in the ATM-PON interface circuit 2A as a whole.

The initial state R1 is entered when a power-on event occurs; that is, when power is switched on at the master station 2. This state may also be entered in other ways: for example, in response to a reset command given by maintenance personnel. In response to certain events that may occur in the initial state R1, the delay-control-state management unit 14 issues a first command to the delay measurement unit 13, then enters state R2 to begin the process of automatic acquisition of a slave-station identification code. An event that causes this process to begin will be referred to as an acquisition-starting event, or as the start of acquisition. Possible examples of acquisition-starting events include instructions entered by maintenance personnel, and instructions generated by hardware or software.

Another event that may occur in the initial state R1 is a setting of the identification code of a slave station that needs to undergo delay control. This event, referred to as a setting-completion event, occurs when, for example, the identification code of the slave station is entered by maintenance personnel together with an instruction for delay control. When a setting-completion event occurs in the initial state R1, the delay-control-state management unit 14 issues the first command and a second command to the delay measurement unit 13, then enters the delay control state R3.

The automatic identification-code acquisition state R2 is provided for automatic acquisition of slave station identification codes. When an acquisition-starting event occurs and a transition to the automatic identification-code acquisition state R2 takes place, the delay-control-state management unit 14 executes an algorithm such as a binary-tree algorithm for automatically acquiring a slave-station identification code. This algorithm requires the exchange of information with a slave station without use of the slave-station identification code, which has not yet been set in the delay-control-state management unit 14. The message field of a downstream PLOAM cell is used for this purpose in the downstream direction. When acquisition of the slave-station identification code is completed and an acquisition-completion event occurs in the automatic identification-code acquisition state R2, the delay-control-state management unit 14 stores the slave-station identification (ID) code internally. This may cause a setting-completion event to occur. When a setting-completion event occurs in the automatic identification-code acquisition state R2, for a slave station requiring delay control, the delay-control-state management unit 14 issues the second command to the delay measurement unit 13, then enters the delay control state R3.

The delay control state R3 is provided for the purpose of executing delay control by, for example, measuring the delay time of a slave station 1-n, and sending the result of the measurement to slave station 1-n. A setting-completion event may occur in the delay control state, due to an instruction from maintenance personnel, for example, for a slave station requiring delay control. In this case, the delay-control-state management unit 14 issues the second command to the delay measurement unit 13, and remains in state R3. An end-of-delay-control event may also occur in the delay control state R3, when delay control has been completed for the slave stations requiring it. In this case, the delay-control-state management unit 14 enters the operational state R4.

The operational state R4 is the state in which normal communication operations are executed. In this state, an acquisition-starting event may occur, causing the delay-control-state management unit 14 to issue the first command to the delay measurement unit 13 and enter the automatic identification-code acquisition state R2. A setting-completion event may occur in the operational state R4 for a slave station requiring delay control, due to an instruction given by maintenance personnel, for example, in which case the delay-control-state management unit 14 issues the first command and second command to the delay measurement unit 13, and enters the delay control state R3.

Another type of event, which may occur in the delay control state R3 and operational state R4, is an alarm detection event related to failure of a delay measurement or an abnormal condition in the arrival phase of received cells. Following this alarm event, delay control operations resume for the relevant slave station. If the alarm event occurs in the delay control state R3, that state is maintained. If the alarm event occurs in the operational state R4, a transition takes place to the delay control state R3.

Since the delay measurement unit 13 manages the states of individual slave stations, a command issued to the delay measurement unit 13 specifies the individual slave station or stations to which the command applies. Instead of specifying the slave stations by their slave-station identification codes, the delay-control-state management unit 14 uses a system of internal codes. When the first command is issued because of an acquisition-starting event in the initial state R1, the slave station corresponding to the specified internal code is not yet known. After the slave-station identification code of this slave station has been acquired, the slave-station identification code is assigned to the internal code.

Referring to FIG. 5, the states managed by the delay measurement unit 13 for each slave station are designated by the symbols S0 for the initial state, S1 for the preparatory state, S2 for the measurement state, and S3 for the operational state.

The initial state S0 is the state in which no processing related to delay control is executed for a particular slave station. If the delay-control-state management unit 14 issues the first command, causing a first-command reception event to occur in the initial state S0, the delay measurement unit 13 has the message-generating unit 17 output a message specifying data to be included in the overhead (OH) of cells transmitted for the purpose of slave-station identification code acquisition, and changes the state of the slave station to the preparatory state S1.

The preparatory state S1 is the state in which preprocessing is carried out in preparation for the execution of a delay-time measurement. If the delay-control-state management unit 14 issues the second command, causing a second-command reception event to occur in the preparatory state S1, the delay measurement unit 13 has the message-generating unit 17 output data to be included in the overhead of cells transmitted for the purpose of delay time measurement by the slave station subject to the measurement, then changes the state of the slave station to the measurement state S2. At this time, the delay measurement unit 13 also causes a consecutive series of unassigned grants, accompanied by a ranging grant, to be issued.

The measurement state S2 is the state in which delay measurements are executed. In the measurement state S2, the delay measurement unit 13 has a PLOAM grant issued to a slave station 1-n subject to the measurement. The other grants made are unassigned grants. The expected time of arrival of the upstream PLOAM cell sent by the designated slave station 1-n in response to the PLOAM grant is set, and the delay time is measured in cooperation with the upstream phase management unit 16. Before the delay measurement, the delay measurement sends slave station 1-n additional necessary information, described later, in a PLOAM cell having the slave-station identification code of slave station 1-n in its message field. After the delay measurement, the delay measurement unit 13 sends slave station 1-n the delay time to be used in future upstream transmissions by slave station 1-n.

If the measurement succeeds, causing a successful-measurement-completion event to occur in the measurement state S2, the delay measurement unit 13 reports the end of delay control to the delay-control-state management unit 14, then changes the state to the operational state S3. If the measurement fails, causing a measurement-failure event to occur in the measurement state S2, the delay measurement unit 13 issues an alarm indicating the failure of the measurement to the delay-control-state management unit 14, and changes the state to the initial state S0.

The operational state S3 enables normal communication operations to be executed. If another slave station is in the preparatory state S1 or measurement state S2, however, the slave stations being managed in the operational state S3 may be unable to transmit in the upstream direction. In the operational state S3, the delay measurement unit 13 and the upstream phase management unit 16 cooperate to supervise the arrival phase of received cells. If an abnormal condition occurs in the arrival phase of received cells in the operational state S3, causing an alarm event to occur, the delay measurement unit 13 notifies the delay-control-state management unit 14 that delay control needs to be repeated for the relevant slave station, then changes the state of that slave station to the initial state S0.

Although this is not indicated in FIG. 5, maintenance personnel may give an instruction to halt a delay measurement, in which case the delay-control-state management unit 14 sends instructions to the delay measurement unit 13 canceling the first command and second command. When a first-command cancellation event occurs in the preparatory state S1 or measurement state S2, the delay measurement unit 13 changes the state to the initial state S0. The delay measurement unit 13 also changes the state to the initial state S0 when a second-command cancellation event occurs in the measurement state S2 or operational state S3.

The state transitions of the slave station 1-n when delay control is carried out conform to the ITU-T recommendations, so a description will be omitted, except to note that the transitions take place according to messages received in downstream PLOAM cells.

As is apparent from FIGS. 4 and 5, the state transitions for delay measurement do not follow a single predetermined path; there are a variety of transition patterns.

One of these transition patterns, which forms a feature of the present embodiment, will be described below. Specifically, an example of the sequence of operations following an instruction given by maintenance personnel for the automatic acquisition of a slave-station identification code will be described.

In this example, a new slave station 1-j is added to the set of slave stations coupled to the ATM-PON interface circuit 2A.

The delay-control-state management unit 14 issues the first command to the delay measurement unit 13, then uses messages in PLOAM cells to execute the algorithm (the binary tree algorithm, for example) for automatically acquiring a slave-station identification code. In the binary tree algorithm, the master station transmits a downstream PLOAM cell with a message requesting any slave station that has not yet received delay control to transmit an upstream PLOAM cell if certain bits of its slave-station identification code have certain values. These bits and their values are specified on the basis of slave-station identification codes that have already been set, and of slave stations that have already transmitted PLOAM cells, to search for a slave-station identification code that has not yet been set. Typically, the master station starts from the least significant bit and works upward. A slave station with an identification code having the specified bit values places its slave-station identification code in the message field of an upstream PLOAM cell. If two or more slave stations transmit upstream PLOAM cells in response to the request, causing the cells to collide, the master station specifies additional bit values, until only a single slave station responds by transmitting a PLOAM cell.

When the first command is issued, while making a search to acquire one or more slave-station identification codes, the delay measurement unit 13 does not perform any delay measurements, but simply sets consecutive unassigned grants on the downstream channel, accompanied by a ranging grant. The consecutive unassigned grants create a certain interval around the ranging-grant in which no signals are sent in the upstream direction. Slave station 1-j, which has not yet received delay control, sends an upstream PLOAM cell in response to the ranging grant, taking advantage of the signal-free interval.

When the slave-station identification code of slave station 1-j has been determined by the algorithm for automatic acquisition, the acquisition-completion and setting-completion events occur. The delay-control-state management unit 14 sets information assigning the slave-station identification code to the above-mentioned internal code, by which slave station 1-j will be managed. The delay-control-state management unit 14 also sets a number referred to as a PON_ID, which will be used to identify slave station 1-j in communication between slave station 1-j and the master station 2, and other numbers that will be used in assigning data grants and PLOAM grants to slave station 1-j. The delay-control-state management unit 14 sets this information in the delay measurement unit 13 and issues the second command. The delay measurement unit 13 passes the information to slave station 1-j in a downstream PLOAM cell. Then, the delay measurement unit 13 performs a delay measurement for slave station 1-j, also sending slave station 1-j the overhead information to be inserted in the upstream delay-measurement cell sent by slave station 1-j.

The delay measurement is performed by calculating the difference between the arrival phase of an upstream PLOAM cell, for example, and the upstream phase expected by the upstream phase management unit 16, in another signal-free interval created for a certain time in the upstream direction by consecutive unassigned grants. The expected upstream phase may have any value that is equal to or greater than the maximum round-trip delay time of the system as a whole.

When the difference between the delay time and the expected value has been measured, the slave station 1-j is notified of the difference by a designated message in a downstream PLOAM cell. Thereafter, slave station 1-j is permitted to transmit cells in the upstream direction, adding the measured time difference. When the measurement is successful, that is, slave station 1-j receives data grants from the ATM-PON interface circuit 2A and is able to transmit ATM cells.

Descriptions of other operating patterns, which can be discerned from FIGS. 4 and 5, will be omitted.

The embodiment described above has the following effects.

(1) The delay measurement unit 13 manages the delay control states of individual slave stations, while the delay-control-state management unit 14 manages the delay control state of the ATM-PON interface circuit 2A as a whole. This division of duties increases the degree of freedom in the design of the ATM-PON interface circuit 2A. For example, the delay measurement unit 13 can be implemented in hardware, while the delay-control-state management unit 14 is implemented in software, or both can be implemented in hardware.

(2) The slave-station identification code of a newly installed slave station does not have to be set at the master station (in the ATM-PON interface circuit 2A) by maintenance personnel in order for the new slave station to receive delay control. This is because the states managed by the delay-control-state management unit 14 include an automatic identification-code acquisition state and a delay measurement state, with an automatic transition from the automatic acquisition state to the delay measurement state, while the delay measurement unit 13 manages the states related to delay control of the individual slave stations.

(3) Flexible methods of delay control can be implemented, because as shown in FIG. 4, the delay-control-state management unit 14 has various state-transition patterns, which are triggered by a variety of events. For example, delay control can be executed either following automatic acquisition of a slave-station identification code, as described above, or in response to an external instruction specifying the slave-station identification code of the slave station for which a delay measurement is to be performed.

(4) The network can be operated efficiently because ATM cells can be sent continuously in the downstream direction, even while a delay measurement is being performed for one of the slave stations.

(5) The slave stations can have a simple structure, because they only have to add the delay value specified in a message from the master station when transmitting cells in response to upstream grants.

In the embodiment above, the invention was applied to an ATM-PON system, but the invention is also applicable to other systems employing a passive double-star network topology.

Those skilled in the art will recognize that further variations are possible within the scope claimed below.

What is claimed is:

1. A transmission apparatus for use in a master station in a passive double-star communication network in which the master station is coupled by a common transmission channel to a star coupler and the star coupler is coupled by individual transmission channels to a plurality of slave stations, the master station specifying cell transmission timings at which individual slave stations may transmit cells, each slave station modifying the specified cell transmission timings by an individual amount so that when the cells are transmitted from the plurality of slave stations through the star coupler, the cells align on a single time axis without overlapping, comprising:

a management unit automatically acquiring identification information of those of said slave stations having said identification information that has not yet been set in the master station; and a measurement unit coupled to said management unit, measuring a propagation delay time between one of said slave stations and the master station, thereby determining said individual amount, after the management unit has acquired the identification information of said one of said slave stations;

wherein said management unit controls said measurement unit by sending said measurement unit a first command and a second command;

said measurement unit responds to said second command by giving said one of said slave stations permission to transmit a cell for measurement of said propagation delay time, and observing a time of arrival of said cell; and said measurement unit responds to said first command by giving any of said slave stations permission to transmit cells for acquisition of identification information.

2. A transmission apparatus for use in a master station in a passive double-star communication network in which the master station is coupled by a common transmission channel to a star coupler and the star coupler is coupled by individual transmission channels to a plurality of slave stations, the master station specifying cell transmission timings at which individual slave stations may transmit cells, each slave station modifying the specified cell transmission timings by an individual amount so that when the cells are transmitted from the plurality of slave stations through the star coupler, the cells align on a single time axis without overlapping, comprising:

a measurement unit for obtaining propagation-delay information by measuring propagation delays between the master station and said slave stations, having a plurality of delay-measurement operating states, managing the delay-measurement operating states individually for each of said slave stations; and a management unit coupled to said measurement unit, managing control states related to delay control for said transmission apparatus as a whole, one of said control states being a delay-measurement control state, sending a command specifying one of said slave stations to said measurement unit, according to a current one of said control states, when an event causing delay measurement to be performed for said one of said slave stations occurs, then entering the delay-measurement control state.

3. The apparatus of claim 2, wherein said control states also include an initial state, from which said delay-measurement control state is entered in response to an external instruction.

4. The apparatus of claim 2, wherein said control states also include an operational state, from which said delay-measurement control state is entered in response to an external instruction.

5. The apparatus of claim 2, wherein said control states also include a state for automatic acquisition of identification information from said slave stations, from which said delay-measurement control state is entered in response to acquisition of said identification information.

* * * * *